(12) United States Patent
Zwinkels

(10) Patent No.: US 10,961,872 B2
(45) Date of Patent: Mar. 30, 2021

(54) ENERGY ACCUMULATOR FOR STORING ELECTRICAL ENERGY AS HEAT AND METHOD FOR THIS PURPOSE

(71) Applicant: Lumenion GmbH, Berlin (DE)

(72) Inventor: Andrew Zwinkels, Berlin (DE)

(73) Assignee: Lumenion GmbH, Berlin (DE)

( * ) Notice: Subject to any disclaimer, the term of this patent is extended or adjusted under 35 U.S.C. 154(b) by 0 days.

(21) Appl. No.: 16/634,317

(22) PCT Filed: Jul. 17, 2018

(86) PCT No.: PCT/EP2018/069446
§ 371 (c)(1),
(2) Date: Jan. 27, 2020

(87) PCT Pub. No.: WO2019/025182
PCT Pub. Date: Feb. 7, 2019

(65) Prior Publication Data
US 2020/0232345 A1    Jul. 23, 2020

(30) Foreign Application Priority Data

Aug. 4, 2017 (EP) .................................... 17184877

(51) Int. Cl.
*F01K 3/18* (2006.01)
*F01K 3/14* (2006.01)
(Continued)

(52) U.S. Cl.
CPC ............... *F01K 3/186* (2013.01); *F01K 3/14* (2013.01); *F28D 17/04* (2013.01); *F28D 20/0056* (2013.01); *F28F 2265/26* (2013.01)

(58) Field of Classification Search
CPC . F01K 3/186; F01K 3/14; F28D 17/02; F28D 17/04; F28D 20/00; F28D 20/0056;
(Continued)

(56) References Cited

U.S. PATENT DOCUMENTS 1,140,125 A * 5/1915 Danforth, Jr. ........... F28D 17/02
165/9.3
1,964,267 A * 6/1934 Moll ....................... F28D 17/02
165/9.4
(Continued)

FOREIGN PATENT DOCUMENTS

DE    4236761 A1    5/1993
EP    3139107 A1    3/2017
(Continued)

OTHER PUBLICATIONS

International Search Report and Written Opinion for Application No. PCT/EP2018/069446 with English translation, Nov. 21, 2018, 20 pages.

*Primary Examiner* — Jianying C Atkisson
*Assistant Examiner* — Jose O Class-Quinones
(74) *Attorney, Agent, or Firm* — LaBatt, LLC

(57) ABSTRACT

An energy storage device for storing electrical energy in the form of heat energy and a corresponding method for operating an energy storage device of this type. The energy storage device includes an electric heater for converting electrical energy into heat energy, a heat storage device for storing the heat energy of the electric heater, and a heat exchanger for emitting heat energy from the heat storage device. The heat storage device includes, at least, multiple metal rods arranged upright and serving to store heat energy from the electric heater; a base; and multiple supporting units. Each supporting unit supports one of the metal rods and is connected with the base.

15 Claims, 11 Drawing Sheets

(51) Int. Cl.
*F28D 17/04* (2006.01)
*F28D 20/00* (2006.01)

(58) Field of Classification Search
CPC ....... F28D 2020/006; F28D 2020/0004; F28D 19/04; F28D 19/041; F28F 2265/26; Y02E 60/14; F24V 99/00
USPC .......................................................... 165/902
See application file for complete search history.

(56) References Cited

U.S. PATENT DOCUMENTS

| | | | | | |
|---|---|---|---|---|---|
| 2,266,257 | A | * | 12/1941 | Osterheld | G05D 23/1923 219/492 |
| 2,450,983 | A | * | 10/1948 | Osterheld | F24H 9/2078 219/491 |
| 3,906,188 | A | * | 9/1975 | Gamell | F01K 3/186 392/391 |
| 3,989,927 | A | * | 11/1976 | Erb | C09K 5/14 392/344 |
| 3,991,936 | A | * | 11/1976 | Switzgable | F28D 20/021 126/590 |
| 4,244,350 | A | * | 1/1981 | Chubb | F22B 1/06 126/400 |
| 4,286,579 | A | * | 9/1981 | Johnston | F24S 90/00 126/694 |
| 4,346,569 | A | * | 8/1982 | Yuan | F25D 3/00 62/260 |
| 4,354,483 | A | * | 10/1982 | Johnston | F24S 23/74 126/584 |
| 4,384,569 | A | * | 5/1983 | Clearman | F24S 23/77 126/617 |
| 4,584,843 | A | * | 4/1986 | Pronger, Jr. | F24F 5/0017 62/123 |
| 4,615,379 | A | * | 10/1986 | Kunzel | F28D 17/02 165/10 |
| 4,880,049 | A | * | 11/1989 | Jaeger | F28D 19/04 165/6 |
| 5,273,635 | A | * | 12/1993 | Gernert | F24V 99/00 204/241 |
| 6,491,877 | B1 | * | 12/2002 | Eckardt | G21C 19/317 422/174 |
| 2010/0257890 | A1 | * | 10/2010 | Murakami | F28D 20/021 62/430 |
| 2011/0083459 | A1 | * | 4/2011 | Salyer | F24H 7/0408 62/238.3 |
| 2011/0083827 | A1 | * | 4/2011 | Salyer | F28D 20/02 165/104.14 |
| 2014/0102662 | A1 | * | 4/2014 | Grama | F28D 20/0034 165/10 |

FOREIGN PATENT DOCUMENTS

| | | | | |
|---|---|---|---|---|
| EP | 3139108 A1 | | 3/2017 | |
| GB | 191310403 A | * | 11/1913 | ............ F24H 3/004 |
| GB | 2261831 A | | 6/1993 | |
| JP | 2006002976 A | | 1/2006 | |
| WO | 2010070704 A1 | | 6/2010 | |

\* cited by examiner

ENERGY ACCUMULATOR FOR STORING ELECTRICAL ENERGY AS HEAT AND METHOD FOR THIS PURPOSE

TECHNICAL FIELD

A first aspect of the present invention relates to an energy storage for storing electrical energy in form of heat energy.

In a second aspect, the invention relates to a method for operating an energy storage in which electrical energy can be stored as heat energy and heat energy can be output.

BACKGROUND

Energy storages for electrical energy are of immense economic relevance. In particular due to increasing harvest of solar and wind energy, the produced amounts of electrical energy vary significantly over time. This leads temporarily to significant surpluses of electrical energy which at present cannot or only to a small part be stored efficiently. Electrochemical storages (batteries) offer only small storage capacities despite high costs. Larger amounts of energy can be stored as heat. It is expected that such energy storages will play a decisive role in an economically increased use of regenerative energy sources. A storage capacity of energy storages should increase with the fraction of solar and wind energy of the total produced amount of electrical energy in a country.

Generic energy storages are described by the applicant in, for example, EP 3 139 108 A1 or EP 3 139 107 A1. A generic energy storage for storing electrical energy as heat energy comprises:
- an electrical heater for converting electrical energy into heat energy;
- a heat storage for storing the heat energy of the electrical heater; and
- a heat exchanger for outputting heat energy from the heat storage.

A method for operating an energy storage in which electrical energy can be stored in the form of heat energy, and heat energy can be output, similarly comprises at least the following steps:
- converting electrical energy into heat energy by means of an electrical heater;
- storing heat energy of the electrical heater with a heat storage; and
- outputting heat energy of the heat storage with a heat exchanger.

The heat storage may be a metal body which is heated over a large temperature range for storing heat energy, for example from room temperature to a temperature near the melting point of the metal body, for example 600° C. The metal body experiences significant thermal expansions due to these strong temperature changes. Thermal expansions may lead to mechanical stress of neighboring components of the energy storage. A problem of conventional energy storages resides in how to limit stress due to thermal expansion of components at low costs and with a particularly simple design.

SUMMARY

It can be considered an object of the invention to provide an energy storage in which thermal stress is particularly small and simultaneously a construction is particularly cost-efficient and allows efficient energy storage and output. Furthermore, a corresponding method for operating an energy storage shall be described.

This object is achieved with the energy storage comprising the features of claim 1 and with the method having the features of claim 15.

Advantageous variants of the energy storage and the method of the invention are subject of the dependent claims and are also explained in the following description.

An energy storage as described above comprises, according to the invention, at least the following:
- a plurality of metal bars arranged upright and for storing heat energy of the electrical heater;
- a base;
- several supporting units, wherein each supporting unit supports one of the metal bars and is coupled/connected to the base.

According to the invention, in the method of the above-referenced kind, the heat storage comprises at least:
- a plurality of metal bars arranged upright and for storing heat energy of the electrical heater;
- a base;
- several supporting units, wherein each supporting unit supports one of the metal bars and is coupled/connected to the base.

Due to the design of the invention, the effects of thermal expansions are advantageously small. In the prior art, a large body is usually used as a heat storage, for example a metal plate. Expansions in a horizontal direction, i.e., transverse or perpendicular to a direction of gravity, may be problematic with such plates. The design of the invention offers advantages by forming a heat storage with a plurality of metal bars. The metal bars have a longitudinal axis arranged upright, i.e., in a vertical direction or in a direction of gravity. Preferably, the metal bars are upwardly free, i.e., not clamped or fixed so that a thermal expansion in the direction of gravity is unproblematic. Expansion in horizontal direction is small as a diameter of the metal bars is considerably smaller than their length in the direction of gravity, for example, the length is at least 5 times or at least 10 times as large as the diameter. In case that the metal bars have an angular cross section, the diameter may be considered to be their largest dimension in their cross-sectional plane. The metal bars are spaced to each other so that a thermal expansion upon heating the metal bars merely decreases space between the metal bars, however, the overall dimension in the cross-sectional directions, i.e., the area covered by the outermost metal bars or by the metal bars furthest apart from each other, is basically constant, despite thermal expansion. This is particularly important for the base which carries the metal bars (through the supporting units). The base is exposed to no or hardly any mechanical stress when the metal bars expand thermally. For a thermal expansion of the base, the supporting units are relevant. The supporting unit at least partially isolates the base from the metal bars so that the base is heated to a lesser extent and slower by the metal bars compared with the case that the metal bars would be in direct contact with the base. In designs of the prior art, especially a heat expansion of the base is very problematic.

By using supporting units between the metal bars and the base, a very simple design of the supporting units is possible, allowing their masses and costs to be low. Furthermore, metal bars can be manufactured very cost-efficiently. Metal bars may also be referred to as rods or billets. Except for the contact to the supporting unit, the metal bars stand free in the space, and thus larger tolerances in shape and dimensions of the metal bars are possible. Furthermore, hardly any or no milling steps are necessary for forming the metal bars. For other shapes, in particular in case that the heat storage shall engage the electrical heating unit or heat exchanger tubes directly, the milling or shaping costs are considerably higher and may by far surpass the material costs of the heat storage.

The metal bars or rods may have a cylindrical shape with an in principle arbitrary cross-sectional shape. For example, their cross section may be circular or rectangular, which allows easy production. The metal bars form the part of the heat storage which serves for storing heat energy. That means, at least 60% or at least 80% of the heat energy that is received during operation by the energy storage is stored in the metal bars, while the remaining parts of the energy are distributed among, for example, the supporting units or the heat exchanger. Alternatively the heat capacity of the metal bars may thus be at least 60% or at least 80% of the heat capacity of the total heat storage.

To keep a heat transfer from the metal bars to the base low, the metal bars may be spaced from the base, i.e., they do not directly contact the base. A contact is preferably provided solely through the respective supporting units. A heat transfer coefficient of the material of the supporting units is preferably smaller than a heat transfer coefficient of the material of the metal bars. For example, stainless steel may be used for the supporting units and another steel, i.e., not stainless steel, is used for the metal bars. Each metal bar is preferably supported by its respective supporting unit, and thus each supporting unit carries exactly one metal bar. A supporting unit consists preferably of an integral body, whereby effects of thermal expansion are less problematic. The supporting unit thus consists of a homogeneous material with a heat transfer coefficient that should be (as described) smaller than the heat transfer coefficient of the metal bar which is preferably also an integral body formed by a homogeneous material. However, alternatively also supporting units are feasible that are directly connected with each other and so form a scaffold which carries several metal bars. In this case a plurality of metal bars may be carried by one supporting unit or a plurality of supporting units serve for supporting one metal bar.

The material of the metal bars should have a preferably high specific heat capacity which is preferably larger than the specific heat capacity of the supporting units or of the base.

Separating the metal bars from the base by means of the supporting units reduces a heating of the base and of the parts of the respective supporting unit that is directly next to the base, and thus thermal expansions at the base should be unproblematic. Additionally also a material of the supporting units and a material of the base may be chosen such that their thermal expansion coefficients differ from each other by at most 10%, preferably at most 5%. In contrast, the exact value of the thermal expansion coefficients of the metal bars is less relevant as the metal bars can expand substantially freely. Materials for the metal bars, the supporting units and the base may thus be chosen such that thermal expansion coefficients of the materials of the supporting units and of the base are closer together than thermal expansion coefficients of the materials of the metal bars and the base.

The heat expansion coefficient may be understood as a change in length due to a temperature increase of 1° C., in particular from 20° C. to 21° C.

The base may define a ground area above which the metal bars are held by means of the supporting units. A width and length of the ground area may be at least as large as the area which is spanned/covered by the metal bars. This ensures a safe stand. The base may consist of a hard body to ensure certain distances and arrangements of the metal bars to each other, which may be relevant with regard to a precise arrangement of the heat exchanger and of the electrical heater relative to the metal bars. The base may in particular consist of concrete or may comprise concrete. The supporting units are preferably enclosed or embedded in the base, thus in particular held in concrete, which provides a safe and cost-efficient mount.

Each supporting unit may be a pipe (exactly one pipe) or may comprise one or several pipes. The pipe may be hollow and hence the mass of the pipe is smaller and thus heat transfer towards the base is reduced. The pipe may, however, also be formed by a rod which is not hollow. The pipe may have a smaller cross section than the metal bar it carries. This also reduces heat transfer to the base.

A lower end of a pipe is secured in or at the base, preferably embedded in concrete. An upper end of the pipe may extend into a receiving opening which each metal bar may comprise at its respective lower end so that the respective metal bar is supported by the pipe (or more general: by the supporting unit protruding in the receiving opening). A cross section of the receiving opening may be larger than a cross section of the upper end of the pipe so that a gap is formed, in particular at room temperature or at 20° C. If the thermal expansion coefficient of the metal bar is larger than the thermal expansion coefficient of the pipe, the gap may ensure that the pipe is not damaged when the metal bar thermally expands. For still guaranteeing support, the receiving opening is sufficiently deep, with a depth in particular at least three times, preferably at least four times as large as the diameter of the receiving opening. Due to the different heat expansions, it may be preferable to merely put the metal bar (in particular with its receiving opening) onto the supporting unit and to not further secure it, in particular to not screw or weld it. Alternatively, a gap may be omitted which increases the pressure of the metal bar on the pipe when heated.

By holding the metal bar above its receiving opening and the protruding pipe of the supporting unit, it is possible that an outer circumference of each metal bar is free and does not abut the supporting units. Advantageously the metal bar may thus freely expand outwards without tensions occurring for example at the supporting unit. As the outer circumference of the metal bar is larger than the inner circumference at the receiving opening, thermal expansions at the outer circumference are more relevant and would entail more serious problems with regard to a supporting unit bordering the outer circumference.

A multitude of metal bars, for example at least 20 or 30, may be arranged next to each other on the same base. The metal bars may be arranged in several rows next to each other and may be aligned with their longitudinal axes parallel to each other.

For efficient heat transfer, it may be preferable that the metal bars stand closely next to each other. In this way a large fraction of the heat radiation emitted by the electrical heater impinges on the metal bars. Furthermore, a close arrangement facilitates employment of a heat exchanger pipe simultaneously for several metal bars. Nevertheless, it is preferable that a distance between the metal bars takes into account their thermal expansion. It may thus be provided that a distance of neighboring metal bars of a row is larger than a thermal expansion experienced by neighboring metal bars in the direction of the row if heated from 20° C. to a temperature 100° C. below their melting temperature, and that this distance is smaller than five times the mentioned thermal expansion. A temperature in the region of 100° C. below the melting temperature of the metal bar or the supporting unit offers a sufficiently large safety margin during operation so that melting is ruled out. Furthermore, an undesired contact between the metal bars is ruled out over a large temperature range. The above-indicated thermal expansion may alternatively be defined for heating from 20° C. to an upper limit of a temperature range that is used in operation of the heat storage.

The heat exchanger may comprise several heat exchanger tubes through which a fluid is conveyed or pumped. The fluid may be, for example, water. More generally, either a liquid or a vapor may be used as a fluid. The heat exchanger tubes may extend between the metal bars and spaced from the metal bars. A heat transfer thus occurs from the metal bars to the heat exchanger tubes and the fluid contained therein by means of thermal radiation of the metal bars. Furthermore, a certain heat transfer is effected by gas between the metal bars and the heat exchanger tubes, i.e., through convection air flow of heated gas. However, no heat transfer occurs by heat conduction within a solid body that would directly couple the metal bars and the heat exchanger tubes.

The electrical heater may comprise several heating elements arranged between the metal bars and distanced from the metal bars. Heat is transferred from the heating elements to the metal bars analogously to the above-described heat transfer to the heat exchanger tubes.

The heat exchanger tubes and/or the heating elements may be movably arranged relative to the metal bars to allow for variable thermal expansion therebetween. To this end, neither the heat exchanger tubes nor the heating elements are connected or fixedly coupled with the metal bars or with the supporting units. The heat exchanger tubes and/or the heating elements may in principle be connected with the base as the base thermally expands only slightly. To achieve that thermal expansion of the heat exchanger tubes and/or the heating elements is unproblematic, they are preferably movably supported or suspended, wherein their suspension is not connected with the metal bars or the supporting units. The suspension may be fixed at the base or at a carrier that is not rigidly connected with the base.

The metal bars may be arranged in several rows and may form, in particular, a chessboard pattern. However, it may be preferred that a row distance between neighboring rows of metal bars is larger than a distance of neigbouring metal bars within a row. In this way, a free space is formed between the rows, and a heat exchanger or an electrical heater may be arranged in the free space. Heat exchanger tubes may be arranged between some the rows of metal bars, and heating elements may be arranged between other rows of metal bars. It may be preferable to arrange heat exchanger tubes and heating elements alternatingly in the free spaces, i.e., in the following order: a row of metal bars, heating elements, a row of metal bars, heat exchanger tubes, a row of metal bars, heating elements, and so forth. The heat exchanger tubes may extend horizontally between the rows of metal bars or with a slope smaller than 10%. The heat exchanger tubes are thus perpendicular to the metal bars or at an angle between 80° and 100°. In this way a heat exchanger pipe extends along several metal bars and receives heat energy from all of these metal bars.

In each case, several heat exchanger tubes may be arranged above each other and spaced apart from each other in different height layers. The heat exchanger tubes thus receive heat energy that is given off over the height of neighboring metal bars. For example, the height layers at which heat exchanger tubes are arranged may span at least 70% of the height of the metal bars. A pump may be provided for each height layer, respectively, or alternatively the heat exchanger tubes of several height layers may be supplied through a flow divider to which a single pump is connected. For uniformly extracting heat from the metal bars, in particular one or a plurality of pumps may be provided for conveying fluid through the heat exchanger tubes and arranged such that flow directions of fluid are opposite to each other in heat exchanger tubes that are on top of each other. Heat exchanger tubes arranged on top of each other may thus extend in parallel, wherein the flow directions are antiparallel within the heat exchanger tubes that are arranged on top of each other.

It is not necessary that the heat exchanger comprises heat exchanger tubes extending between the metal bars. Instead, a heat transfer medium of the heat exchanger may also freely flow between the metal bars and may contact the metal bars. The heat exchanger may comprise a ventilator through which gas as a heat transfer medium is conveyed along the metal bars. A ventilator may be understood to comprise any unit with which a gas can be accelerated, for example a compressor or a fan. A casing may be provided which encloses the electrical heater and the heat storage, in particular airtight. The heat exchanger may comprise an inlet pipe in a lower region of the casing to introduce gas to be heated into the lower region of the casing, in particular into an area below the metal bars. The heat exchanger may comprise an outlet pipe at an upper region of the casing to let heated gas out of the upper region of the casing. More generally, the upper and lower regions may be understood such that the upper region is above the lower region. However, if additionally the gas inlet into the casing which is formed by the inlet pipe is below the metal bars so that inflowing gas first reaches the supporting units, then the supporting units are cooled by the relatively cooler gas. This is advantageous to reduce a warming of the base and the thermal expansions thus caused. The outlet pipe and thus a gas outlet from the casing may be advantageously arranged above the metal bars. This is advantageous for a uniform flow of the gases through the casing: Above the metal bars, the casing provides a free space which is substantially free of obstacles to the flow so that a basically uniform pressure exists here; the metal bars are close to each other and thus act as an obstacle to the flow/act as a throttle causing a pressure drop; the supporting units are further spaced apart from each other than the metal bars and thus form a lower region which has a basically common pressure. When gas is fed into this lower region which has an approximately uniform pressure, a pressure drop upwards to the space above the metal bars occurs due to the metal bars, wherein an approximately uniform pressure exists in said space above the metal bars; this means that gas rises approximately uniformly between all metal bars and not just only close to the gas inlet at the casing. Therefore the arrangement of the gas inlet and gas outlet is important to achieve a uniform heat output of all metal bars to gas flowing past them.

The heat exchanger may form a closed circuit in which the gas circulates. Preferably an inert gas or gas mixture may be used as the gas. This may in particular be understood as a gas mixture without oxygen. This keeps the danger of corrosion of the metal bars and of the electrical heater low.

At the closed circuit of the heat exchanger, a second heat exchanger may be provided which gives off heat energy to a second fluid circuit. Preferably the ventilator of the heat exchanger may be arranged outside of the casing to avoid being subjected to the high temperatures within the casing.

Preferably the ventilator is thus arranged between the second heat exchanger and the inlet pipe.

In operation the temperature of the heat storage varies strongly and may be for example 20° C. or 600° C. depending on the charging state. The temperature of gas as a heat transfer medium thus depends strongly on the charging state of the heat storage. Too high an air or gas pressure at a high gas temperature should be avoided. To this end, the closed circuit of the heat exchanger may comprise an expansion volume with a size that increases with pressure. This may be effected, for example, through a movable wall which may optionally be biased (e.g., a spring pushes the movable wall against the encased gas). With increasing gas temperature, the movable wall is moved by the increasing gas pressure so that the gas pressure does not become unduly high with increased gas temperature.

The heating elements between the rows of metal bars may span a height which corresponds to at least 70% of the height of the metal bars and may span a length which extends over a whole length of the neighboring rows of metal bars. This provides a very uniform heating of the metal bars.

A heating element may be in principle arbitrarily designed as long as it converts electrical energy rather completely into heat energy, for example at least 80% of it. The heating elements may in particular function according to the resistive principle, i.e., an electrical current flows through the heating elements thus heating them due to their electrical resistance. A heating element may comprise, e.g., helically or meanderingly extending metal rods or a metal plate into which gaps or spaces are milled or provided by other means (for example through laser cutting) such that the remaining parts of the metal plate have a meandering shape, i.e., a meandering lane or serpentine shape. The electrical resistance of the metal, for example steel, is used to heat the metal. To this end, the meandering rail or lane may be provided with electrical terminals at which a voltage can be applied.

It may be provided that just one heating element as described above is arranged between two rows of metal bars of the heat storage.

A plate-shaped heating element may be arranged between rows of metal bars of the heat storage such that the metal plate is upright, i.e., a long side of the plate shape and not its direction of shortest dimension (which may be referred to as a thickness/strength of the metal plate) is aligned with the longitudinal direction of the metal bars. Due to the upright arrangement, a large share of the heat energy emitted from the metal plate reaches the metal bars of the heat storage, while only a smaller fraction of the heat radiation which is emitted at the slim side faces of the metal plates is radiated into other directions in which no metal bars are arranged.

High power levels, e.g., up to 8 MW, may be fed into the energy storage through the heating elements.

The design of a heating element in a meandering shape must prevent that deformations (for example due to the weight of the heating element or through thermal expansion) result in that neighboring parts of the meandering shape come in contact with each other. Holding bars may be employed to this purpose which are connected with the meandering shape sections and hold these in a defined relation to each other. A rail (i.e., a row or a rod section) of the meander shape may be regarded as a meandering shape section. Preferably each rail extends in the direction of gravity (parallel to the metal bars) so that the several rail sections neighbor each other in a horizontal direction. This is important for stability, suspension and securement of the metal plate. It may be preferable that a respective holding element such as a hole or a protrusion is formed in an upper and/or lower region at different, in particular all of the meandering rail sections. For the holding elements in the upper or lower region, one or more holding bars are provided which comprise securing shapes (holding features) at positions matching the holding elements, the securing shapes engaging with the holding elements. If the holding elements are formed as holes or recesses, the securing shapes may be formed as protrusions or hooks, or vice versa. In this way a metal plate may be held, and a distance between the meandering bar sections is guaranteed. In particular a holding bar may be provided which is connected with the holding elements in the upper region (said holding bar thus extends horizontally), while a second holding bar is connected with the holding elements in the lower region and thus also extends horizontally.

The holding bars are electrically insulated at least at their surfaces to avoid an undesired electrical contact between the meandering lanes and also between the metal plate and a neighboring element (for example the heat storage).

For each heating element a respective suspension may be provided which is positioned, as seen in a horizontal direction, at a central region of the respective heating element, wherein outer regions of the heating element in this horizontal direction are free (i.e., no suspension provided at those locations) to allow thermal expansions of the heating elements in the horizontal direction. A lower side of each heating element may be held freely in the air (thus spaced apart for the base located beneath it) to allow thermal expansions of the heating elements in a vertical direction. A suspension may be connected with one or more central metal bars of the heat storage, i.e., a heating element may be held by one or more metal bars of the heat storage. "Central" may here be understood to refer to the middle of a row of metal bars.

Alternatively it is also possible that the central suspension of a heating element is connected with the base. This allows the heating element to thermally expand freely upwards and in the horizontal directions. However, the heat transfer to the base may in this case be larger which makes the thermal expansion of the base more problematic. Therefore, it may be preferable if the suspension of the heating elements leads to the metal bars or to another scaffold which is not connected with the base to restrict a heat transfer to the base.

The design of the electrical heater or its suspension may also be seen as an independent inventive concept which may be implemented independently from the above described design of the heat storage, i.e., independent of the metal bars, supporting units and the base.

Expressions according to which the energy storage comprises an electrical heater, a heat storage and a heat exchanger may also be understood such that at least one electrical heater, at least one heat storage and at least one heat exchanger are provided.

Variants of the method of the invention result from the intended use of the features of the energy storage which are described as optional characteristics.

BRIEF DESCRIPTION OF THE FIGURES

Further advantages and features of the invention are described hereinbelow with reference to the attached schematic figures in which.

Similar and similarly acting components are generally referenced in the figures with common reference signs.

DETAILED DESCRIPTION OF EMBODIMENTS

Figure 1:
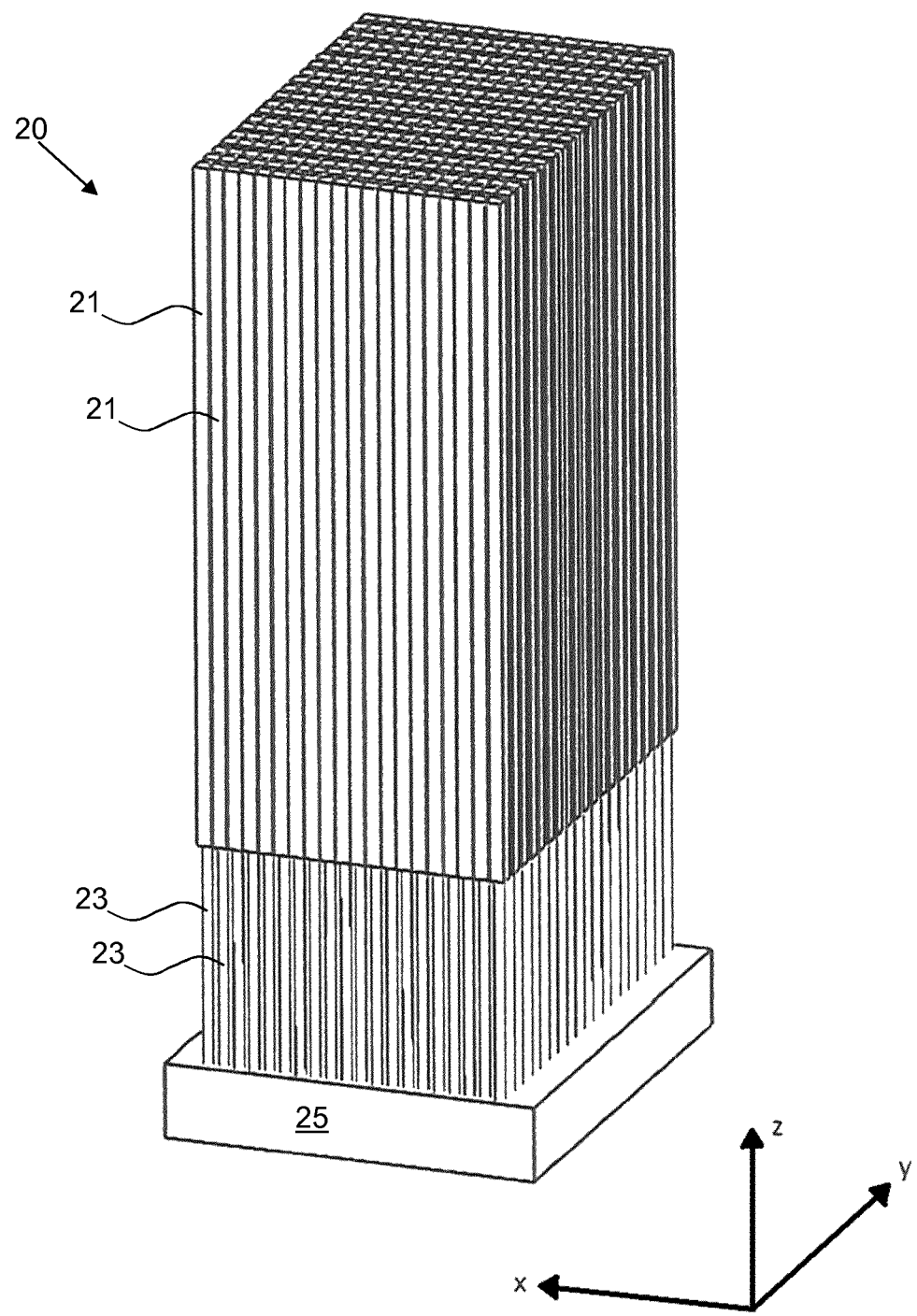
FIG. 1 a schematic perspective illustration of a heat storage of an energy storage of the invention.

FIG. 1 shows a schematic perspective view of a heat storage 20 of an exemplary embodiment of an energy storage of the invention.

The energy storage comprises, in addition to the heat storage 20, an electrical heater (which is not depicted here) through which electrical energy can be input from outside into the energy storage and stored there. The electrical heater may be connected with an external power grid and may be operated to consume electrical energy always at times of a temporary oversupply of electrical energy. The electrical heater converts the electrical energy into heat energy. This heat energy is transferred to the heat storage 20 described in further detail below and is temporarily stored there.

To take heat energy from the energy storage, the energy storage comprises a heat exchanger not shown in FIG. 1. The heat exchanger and more specifically a fluid conveyed in the heat exchanger is heated by the heat storage 20. The heated fluid is conveyed away and may in particular be used for heating purposes or for generating electrical energy. So with the heated fluid or with another working fluid which is heated by the heated fluid, an engine-generator unit or a turbine-generator unit can be driven to generate electrical energy.

The heat storage 20 comprises several metal bars 21 which are heated for storing heat energy. The metal bars 21 are arranged upright, i.e., their longitudinal direction is parallel to the direction of Earth's gravity field. Each metal bar is carried by a respective supporting unit 23, wherein the supporting unit 23 in turn is fixed to a common base 25. All metal bars 21 are thus supported above the common base 25.

The metal bars 21 are heated strongly for storing heat, for example over a temperature range of at least 300° C. or at least 500° C. To store particularly large energy amounts, a large temperature range can be desired. With such large temperature changes, thermal expansions of the heated components become relevant. As different materials are subject to different thermal expansions, in principle tensions or damages may occur between these components. According to the invention, this danger is minimized through the design of the heat storage and the arrangement of other components of the energy storage.

To this end, the rod-shaped design of the metal bars or metal rods 21 and their upright arrangement is important: The strongest thermal expansion in absolute values is experienced by the metal bar 21 in the longitudinal direction. By holding the metal bars 21 only at their lower ends, while the metal bars 21 are otherwise free, an expansion in the longitudinal direction is possible without tensions to neighboring components. Through the upright arrangement it is possible to hold a metal bar solely at its lower end (or in principle at its upper end); in contrast to a, for example, horizontal arrangement, it is not necessary to provide a supporting unit at a plurality of locations or at both ends of the metal bar. In a cross-sectional direction, a thermal expansion of the metal bar is thus unproblematic, in particular if the metal bar is surrounded in this direction only by air/gas, as described further below in more detail. Also because the cross section of the metal bars is relatively small, a thermal expansion in the cross sectional plane is small in absolute values.

Figure 4:
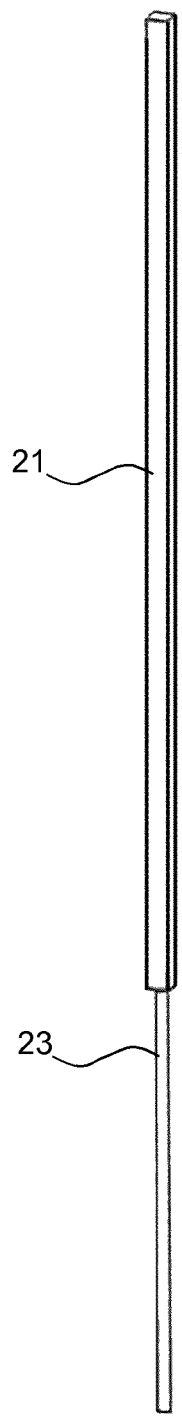
FIG. 4 a perspective view of parts of a heat storage of an energy storage of the invention.
Figure 5:
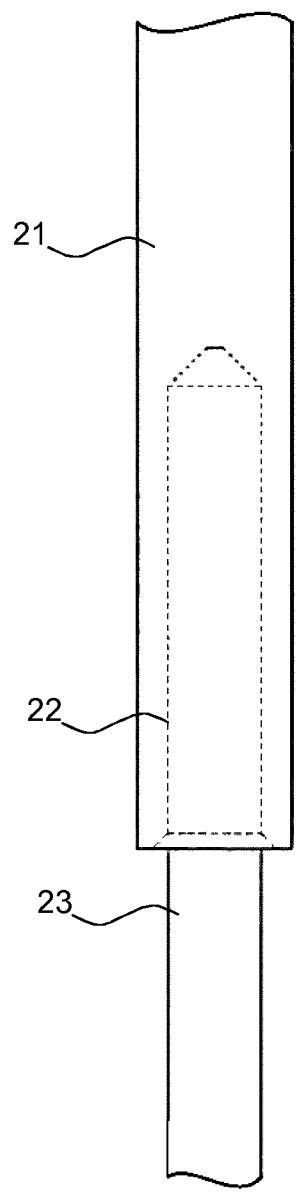
FIG. 5 a cut view of parts of a heat storage of an energy storage of the invention.

Each supporting unit 23 supports one of the metal bars 21. A combination of metal bar 21 and supporting unit 23 is shown in a perspective view in FIG. 4. Furthermore, FIG. 5 shows a length cut through a connection area between metal bar 21 and supporting unit 23. As shown, the supporting unit 23 may be formed by a rod or a pipe 23. The pipe 23 has a smaller cross section than the metal bar 21. This is useful for mounting and heat insulation. A smaller cross section reduces a heat transfer through the pipe 23 to the base. As the base may be formed integrally or without free spaces, it is important that the base heats up to a lesser extent and slower than the metal bars.

The smaller cross section of the pipe 23 may be useful if the metal bar 21 has a receiving opening or bore 22 at its lower end into which the pipe 23 protrudes. In this way, the metal bar 21 may be held on the pipe 23 without being welded, screwed or fixedly connected to each other. Instead, the metal bar 21 is seated on the pipe 23 and thus different heat expansions are unproblematic. For this stacking, an upright arrangement of the metal bars is advantageous. Furthermore the support in the receiving bore 22 has the effect that an outer circumference of the metal bars 21 may be free, i.e., the circumferential surface of each metal bar 21 is only next to air or in particular not next to a supporting unit. This avoids potential problems through different heat expansions at the outer circumference of the metal bars 21.

As suggested in FIG. 5, the receiving bore 22 may have an introduction portion which is wider or widening towards the end of the metal bar 21. This introduction portion facilitates putting the metal bar 21 and the pipe 23 together. Behind the introduction portion a shape of the receiving bore 22 corresponds to the shape of the pipe 23, in the shown example thus cylindrical with a round or in principle angular cross section. A closed end of the receiving bore 22 which is distanced from the lower end of the metal bar 21 may be tapered, as shown in FIG. 5. This shape is expedient if an upper end of the pipe 23 also has a decreasing cross section towards the end, which is helpful for inserting the pipe 23 in the receiving opening 22.

A length of the pipe 23 may correspond to between 20% and 50%, preferably between 25% and 45% of the length of the metal bar 21. A large length of the pipe 23 is desired for a large distance to the base and thus a particularly good heat insulation to the base. However, the mechanical stability of the pipe 23 decreases with increasing pipe length, for which reason in case of a large pipe length a cross sectional size of the pipe 23 must be chosen larger, which in turn undesirably increases the heat transfer to the base. Thus an ideal range of lengths of pipe 23 exists, which depends on the metal bar 21 to be carried. If the pipe length is smaller than 20% of the metal bar length, the distance to the base is so small that a heat transfer becomes undesirably high; with a pipe length larger than 50% of the metal bar length, the heat transfer in turn becomes undesirably high due to a larger necessary pipe diameter.

In particular in the above cases it may be provided that a diameter of the metal bar is between 1.5 and 2.5 times the diameter of the pipe.

Figure 2:
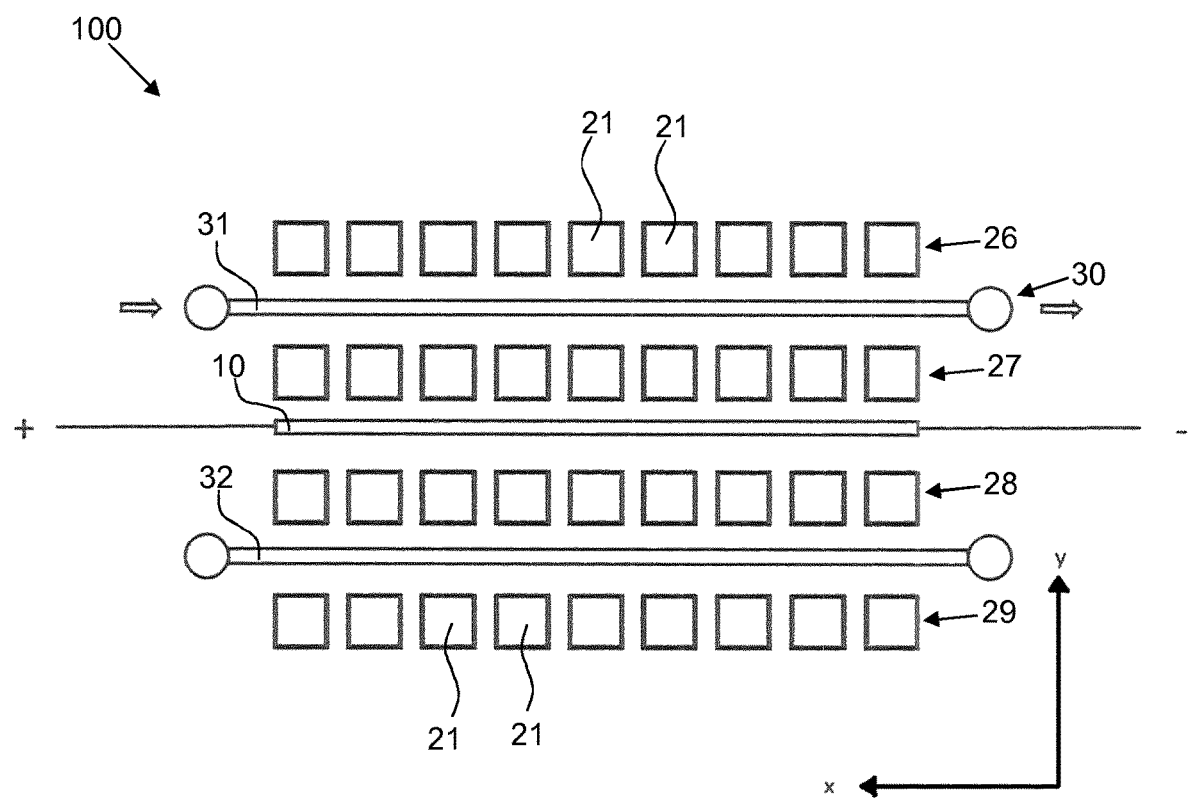
FIG. 2 a schematic cross-sectional view of an energy storage of the invention.

Interaction of the heat storage 20 with other components of the energy storage is described in the following with reference to FIG. 2. FIG. 2 shows the energy storage 100 in a cross-sectional view (i.e., a cut perpendicular to the longitudinal direction of the metal bars of the heat storage). The metal bars 21 have a rectangular, preferably quadratic, cross section in this example. The metal bars 21 are arranged in several rows 26, 27, 28. A distance between neighboring metal bars 21 within one row 26, 27, 28 is smaller than a distance between two neighboring rows 26, 27 or 27, 28. This creates a respective free space between neighboring rows 26, 27, 28. In one or several of the free spaces, a respective heating element of an electrical heater 10 is arranged. In one or several other of the free spaces, heat exchanger tubes 31, 32 of a heat exchanger 30 are arranged. The heating element or the heat exchanger tubes 31, 32 do not contact the metal bars 21.

The heating element of the electrical heater 10 may extend continuously over the whole length or over at least 80% of the whole length of the neighboring rows 27, 28. The heating element is heated and thus emits heat radiation. A heat transfer from the electrical heater 10 to the metal bars 21 and from the metal bars 21 to the heat exchanger or the heat exchanger tubes is effected through heat radiation and through gas therebetween, wherein no connecting body is provided between the heating elements and the metal bars 21 or between the metal bars 21 and the heat exchanger 30 or the heat exchanger tubes 31, 32, through which a heat transfer could occur. Advantageously the metal bars 21, the electrical heater 10 and the heat exchanger 30 may experience independent and different heat expansions from each other in operation, without tensions between these components.

A distance between metal bars 21 of one row 26 is smaller than a diameter of the metal bars 21 (or smaller than a dimension of the metal bar in direction of the row 26). With such a small distance, heat radiation emitted from the electrical heater 10 impinges substantially completely on the metal bars 21 and passes a row 27 of metal bars 21 only to a small extent. This is important for a particularly efficient heat transfer. Furthermore, heat radiation which is emitted from the metal bars of a row 26 and which passes the heat exchanger tubes 31, impinges on the metal bars of the next row 27 and thus the emitted heat energy is not lost but remains in the heat storage.

The electrical heating element of the electrical heater 10 may be formed with one or more metal bodies to which an electrical current is supplied and which thus heat up. Between different rows of metal bars, a respective electrical heating element may be provided. In the direction transverse to the rows (i.e., in the free spaces between different rows) electrical heating elements and heat exchanger tubes may alternate, as shown in FIG. 2.

Figure 3:
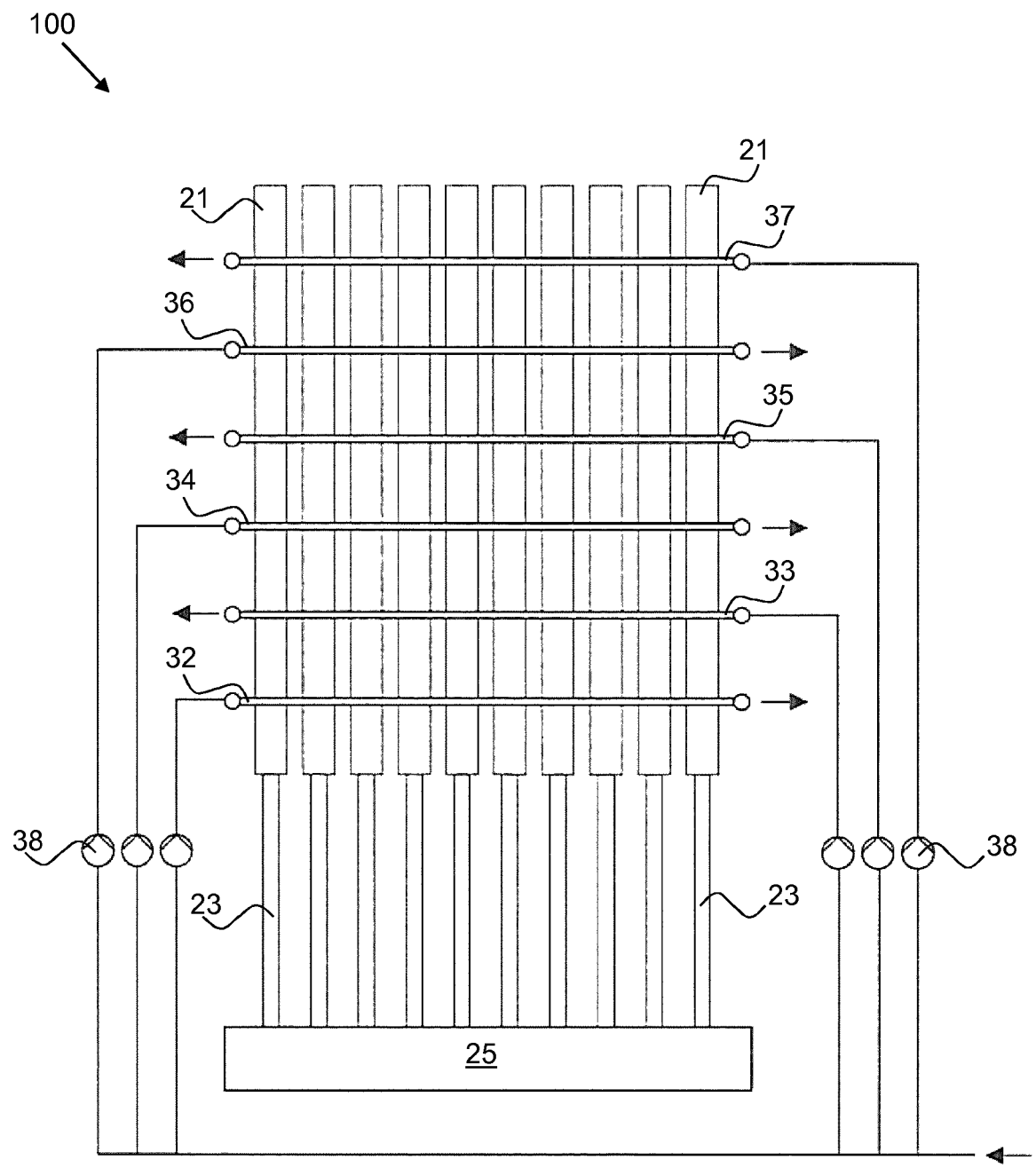
FIG. 3 a schematic longitudinal cut of an energy storage of the invention.

A longitudinal cut of an energy storage 100 of the invention is shown in FIG. 3. It can be seen that the base 25 is at least as long as the rows of metal bars and may be formed integrally, for example as a block of concrete. The pipes 23 may protrude directly into the concrete block or into holding devices at the concrete block and may be secured in this way. The material of the pipes 23 is chosen such that their thermal expansion coefficient deviates at most by 5% from the thermal expansion coefficients of the material of the base. Each pipe 23 may be connected with the base 25 independently from each other or the pipes 23 may be connected with each other and then jointly mounted to the base 25.

As shown in FIG. 3, several heat exchanger tubes 32-37 extend above each other between the same two rows of metal bars. Such a stacking of heat exchanger tubes allows to transfer heat energy over the whole height of the metal bars to the heat exchanger. Preferably a distance from the uppermost to the lowest heat exchanger pipes 32, 37 corresponds to at least 80% of the height/length of the metal bars 21. Depicted is also a flow direction of fluid in the heat exchanger tubes. The flow direction is opposite in heat exchanger tubes 32, 33 that neighbor each other in a top-bottom-direction. In this way a more uniform heat output is achieved over a row of metal bars.

Different heat exchanger tubes 37 which extend on the same height between different rows of metal rods may be connected with each other and may share a pump 38. This achieves a simpler setup with a more uniform fluid flow and thus a more uniform heat output.

Fluid must be pumped further upwards to a heat exchanger pipe 34 which is arranged higher than another heat exchanger pipe 33, and thus, without further measures, a flow rate in heat exchanger tubes decreases with increasing height of the heat exchanger pipe. A heat output in the upper region of the metal rods would then be lower. To compensate this, heat exchanger tubes 37 in an upper region may be supplied with a stronger pump pressure than heat exchanger tubes 32 in a lower region.

Instead of several or different pumps 38, also a common pump may be employed with fluid dividers. Different pressures may be provided through throttles in lines between the common pump and the described heat exchanger tubes.

Figure 6:
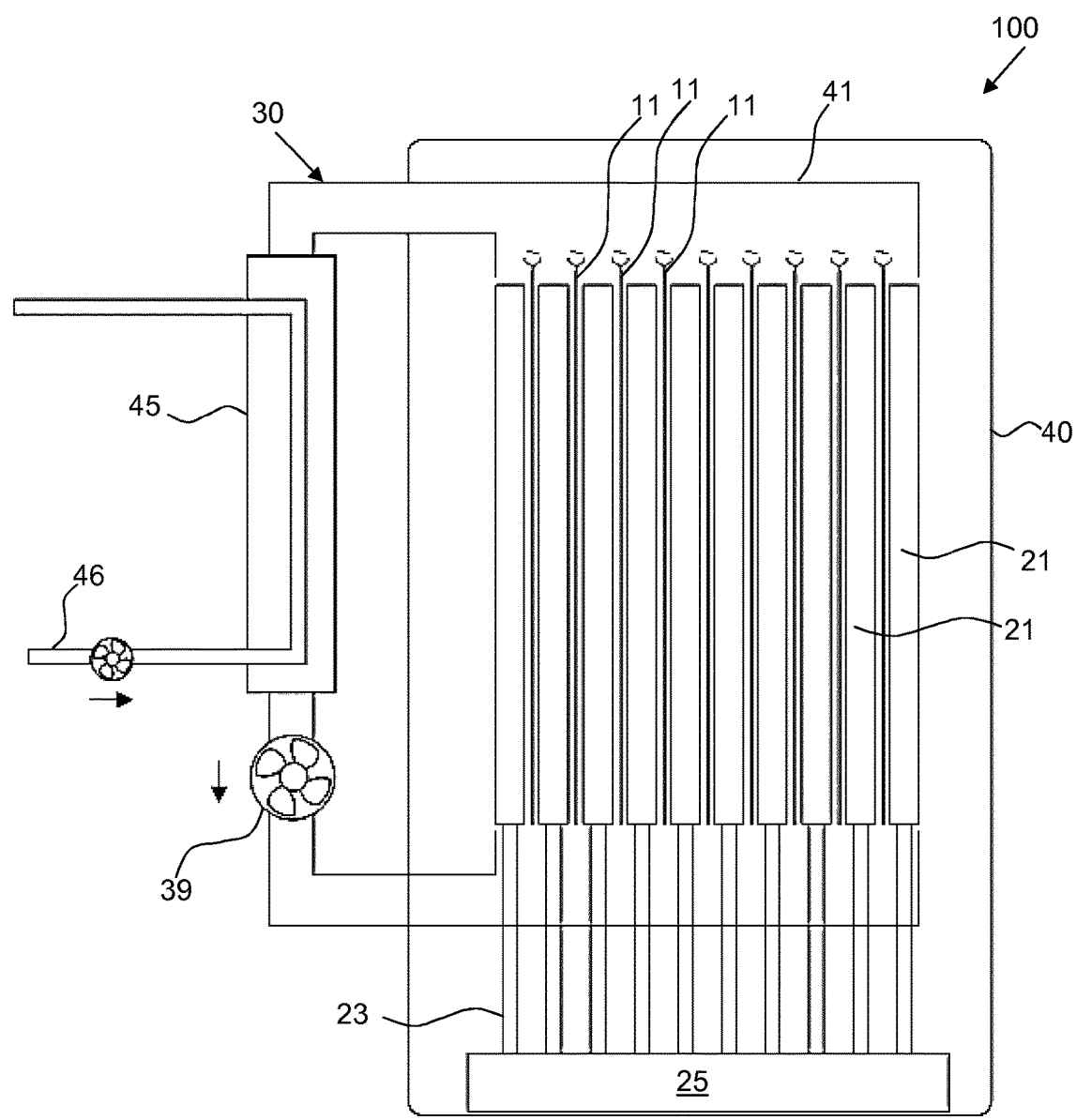
FIG. 6 a further exemplary embodiment of an energy storage of the invention.

FIG. 6 shows a further exemplary embodiment of an energy storage of the invention. This energy storage differs from the previous examples in the design of the heat exchanger 30. In this case the heat exchanger does not comprise tubes for a heat transfer fluid extending between the metal bars 21 or the heating elements 11. Instead the heat transfer fluid flows here freely along the metal bars 21. The metal bars 21 of the heat storage and the heating elements 11 are enclosed in a casing 40 which may be thermally insulated and may provide a room for the heat transfer fluid (wherein the room is air tight except for inlet openings and outlet openings). Alternatively or in addition also gas/air guiding walls 41 may be provided which form limiting walls for the heat transfer fluid. The air guiding walls 41 and/or the casing 40 also enclose a lower region beneath the metal bars 21 as well as an upper region above the metal bars 21, in addition to the region of the metal bars 21 and heating elements 11. The heat exchanger 30 comprises an inlet pipe which leads into the lower region, and an outlet pipe which is connected with the upper region. A ventilator 39 conveys gas as heat transfer fluid via the inlet pipe into the lower region from where it rises along the metal bars 21 and heating elements 11, where it is heated and finally exits through the outlet pipe. The outlet pipe leads to a second heat exchanger 45 through which heat is output to a further fluid circuit 46. From the second heat exchanger 45, the gas reaches again the inlet pipe, via the ventilator 39. As this design of the heat exchanger 30 does not use heat exchanger tubes within the casing 40, the problem of heat expansion of heat exchanger tubes is avoided; furthermore the introduction of the relatively cool gases (the gas is cooler than the metal bars 21) in the lower region has the consequence that the supporting units 23 and thus the base 25 are cooled or are less strongly heated. This is a significant advantage with regard to the heat expansion of the base 25.

Due to the free upper region and the free lower region (in comparison with the metal bars 21 and heating elements 11 which are arranged tightly next to each other and which act as a throttle for incoming gases and thus cause a pressure drop), a uniform distribution of the introduced gases in the lower region is caused before the introduced gases rise along the metal bars 21. Advantageously a uniform flow along the metal bars 21 can be provided, without the ventilator 39 or other means for conveying the gases necessarily arranged within the casing 40, where material stress would be high due to the high temperatures.

Figure 7:
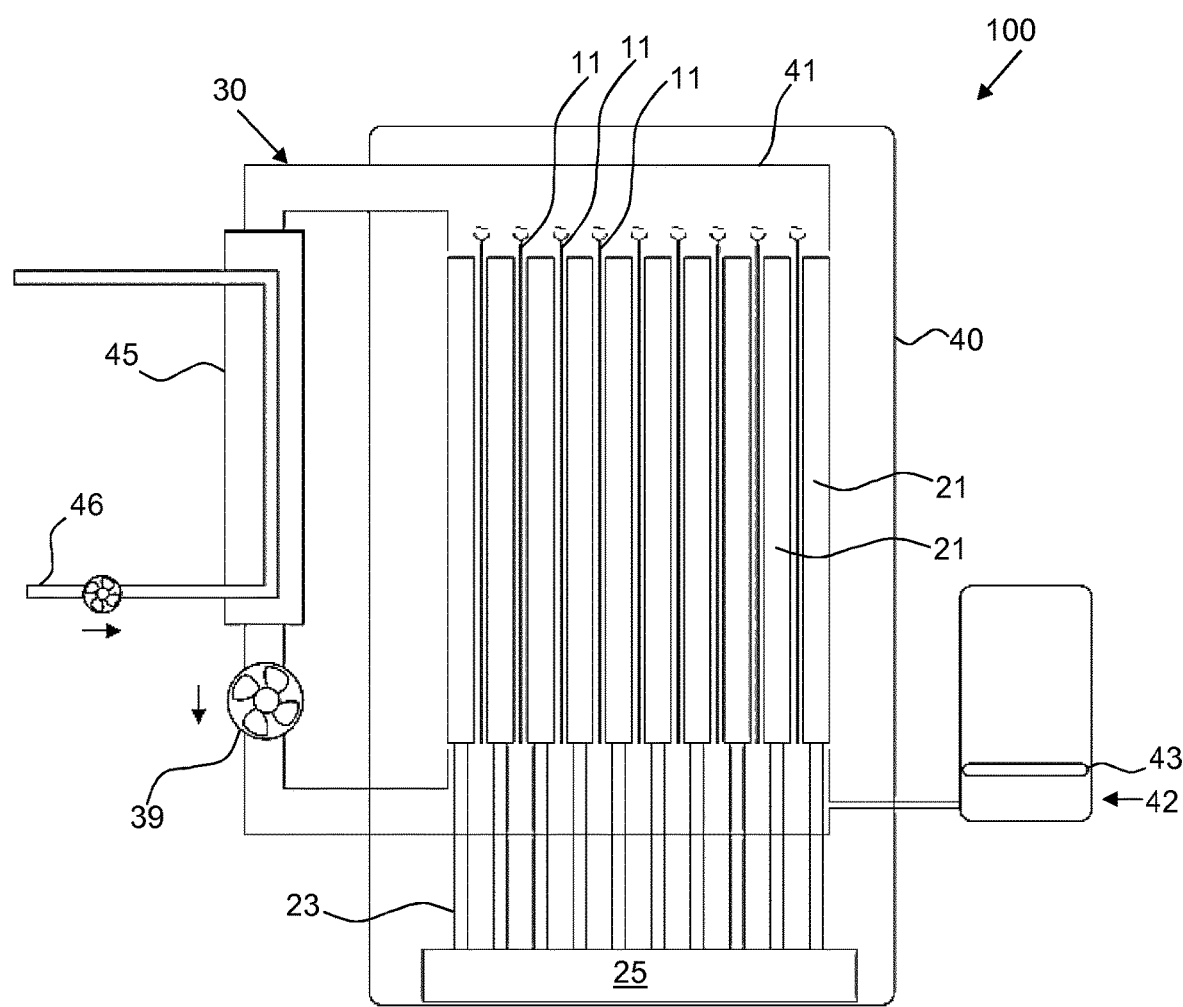
FIG. 7 another further exemplary embodiment of an energy storage of the invention.

FIG. 7 shows a variant of the exemplary embodiment of FIG. 6. The closed circuit of the heat exchanger 30 comprises in this case an expansion volume 42 with a size that increases with increasing pressure of the enclosed air. The expansion volume may comprise a movable wall 43 for this purpose. Advantageously, this at least partially compensates a pressure increase in the heat exchanger 30 which results from a temperature increase of the air. The expansion volume 42 may comprise a container with a variable volume which is coupled through a line with the remainder of the heat exchanger volume. The line may connect to the remainder of the heat exchanger volume upstream of the metal bars 21 so that not the air which is just heated by the metal bars 21 is conveyed into the expansion volume 42 but the air which is just cooled at the second heat exchanger 45; in this way a smaller amount of heat energy remains unused at the expansion volume, which increases the overall efficiency. Alternatively, the line may also connect to the upper region of the casing 40 or to the pipe from the upper region to the second heat exchanger 45. In this case, air just heated at the metal bars 21 is led into the expansion volume 42, and thus the resulting pressure compensation reacts particularly sensitively to the temperature of the heat storage 20.

Figure 8:
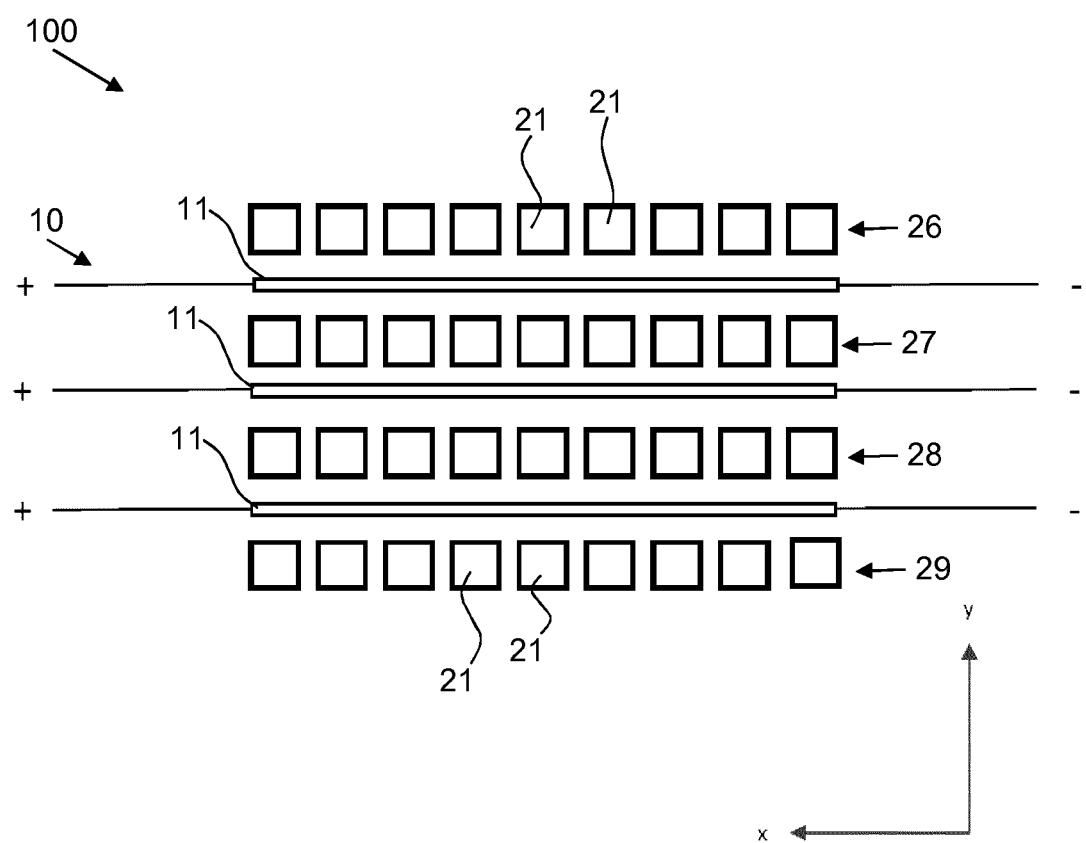
FIG. 8 a horizontal cut through the energy storage of FIG. 6 or FIG. 7.

FIG. 8 shows a horizontal cut through the energy storage of FIG. 6 or FIG. 7. A respective one of the heating elements 11 of the electrical heater 10 is located between two neighboring rows 26, 27 or 27, 28 of metal bars 21. Heat exchanger tubes are here not arranged between the rows of metal bars 21.

Figure 9:
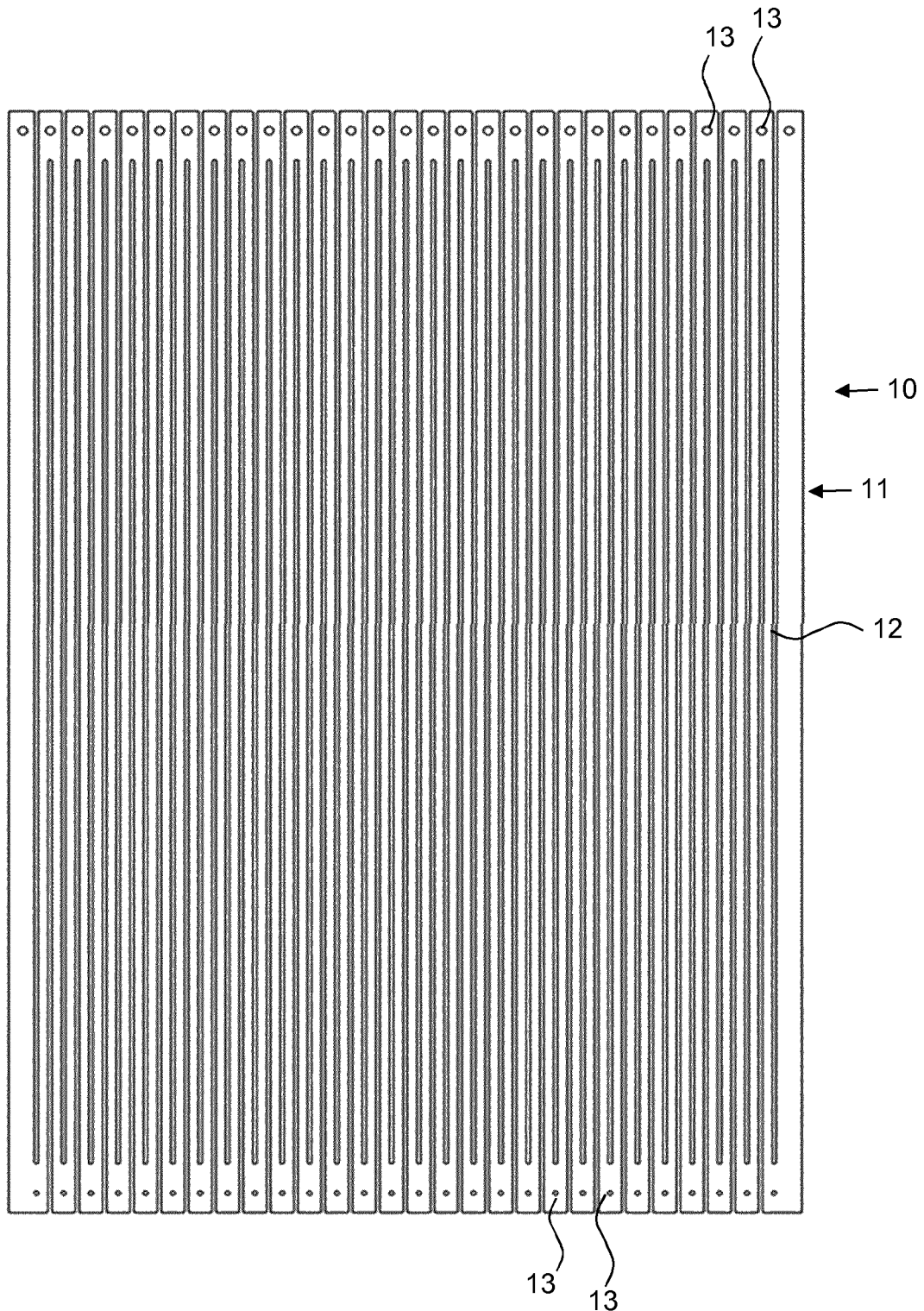
FIG. 9 a heating element of an energy storage of the invention.

FIG. 9 shows in more detail the design of a heating element 11 as it can be used in all the described exemplary embodiments. The heating element 11 comprises a metal plate in which gaps are cut so that the remaining metal plate forms a meandering lane 12. The gaps may be formed by, e.g., laser cutting or milling, and cutting the metal plate such that the meandering lane 12 extends within the two longer dimensions of the metal plate (and not in the shorter dimension which is the plate thickness which extends into the paper plane of FIG. 9). At different ends or sections of the meandering lane 12 electrical contacts are provided (not shown) through which a voltage is applied. An electrical current then flows along the meandering lane 12 and the metal plate heats up due to the electrical resistance of the metal, which is also referred to as resistive or ohmic heating.

The stability of the metal plate in view of thermic expansions is important as the metal plate may heat up from room temperature to above 600° C. in operation. In particular, it must be avoided that sections of the meandering lane warp and come in contact with each other which would result in a short at the contact, with the consequence that parts of the meandering lane would hardly be supplied by electric current and would heat up less. To avoid this, one or more supporting rods/holding bars are attached to the metal plate. The metal plate comprises holding elements 13 which may be, for example, holes or protrusions at the metal plate which may be arranged in a horizontal row at an upper end of the metal plate. In particular, a holding element 13 may be provided at each U-shaped turn of the meandering lane. It is similarly preferred that a respective holding element 13 is also provided at the lower region of the metal plate at each U-shaped turn of the meandering lane.

Figure 11:
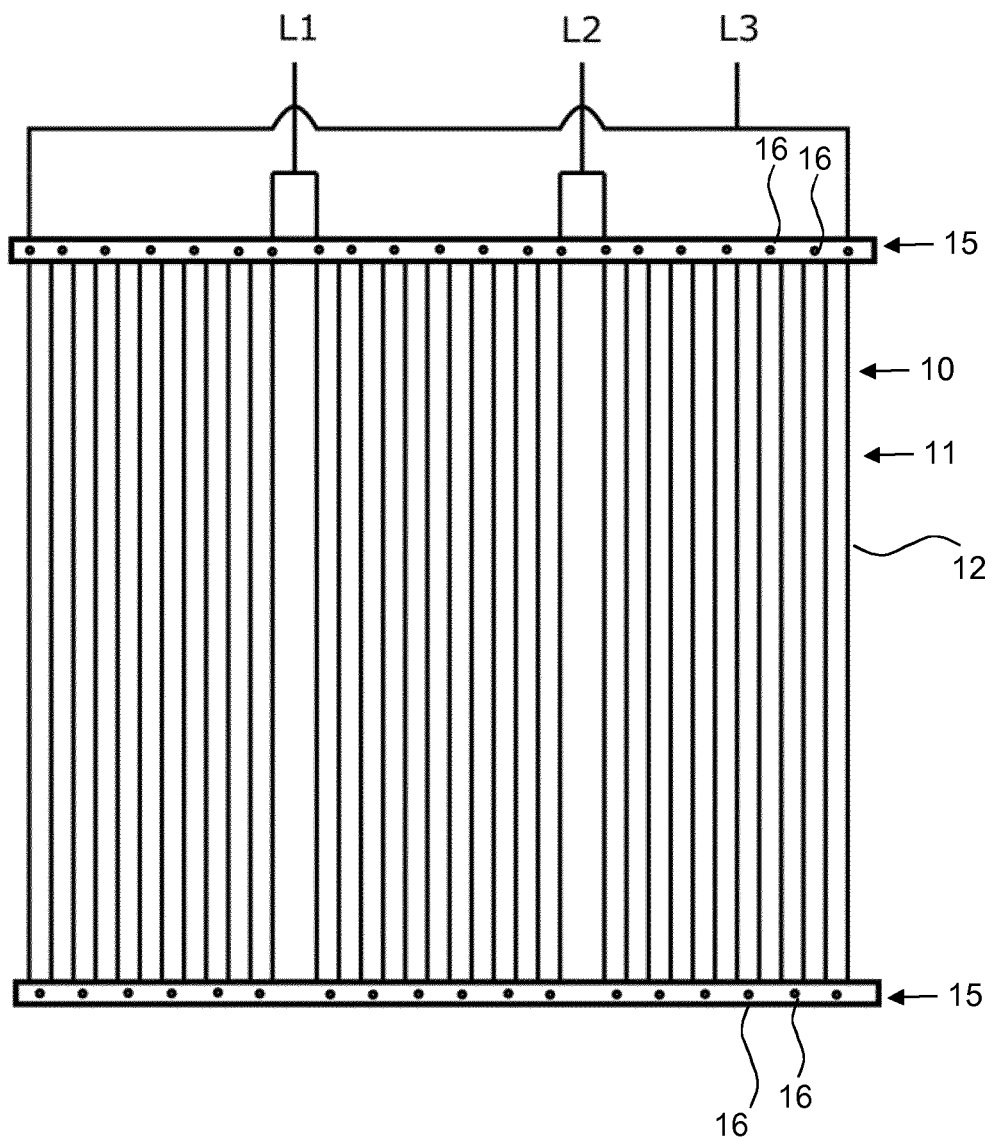
FIG. 11 a heating element of an energy storage of the invention.

A holding bar 15 which is schematically shown in FIG. 11 may comprise holding features 16 which may be chosen to correspond to the holding elements 13 so that securement between the holding features 16 and the holding elements 13 is possible. A holding bar 15 is connected with all holding elements 13 of a row. In the example of FIG. 11, a holding bar 15 for the upper row of holding elements 13 is provided and a further holding bar 15 is provided for the lower row of holding elements 13. This avoids an undesired warp at each U-shaped bow of the meandering lane.

The holding bars 15 preferably consist of a material or materials with a heat expansion coefficient that deviates at most by 10% from the heat expansion coefficient of the material of the metal plate. This keeps material tensions caused by heat expansion low. The holding bars 15 are electrically insulating at least at their surfaces to avoid establishing an additional electrical contact between sections of the meandering lane.

The holding bars 15 also facilitate suspension of the metal plate: The holding bar(s) may preferably be suspended from a central region (in a horizontal direction) so that the horizontals ends of the holding bar and the metal plate can freely expand in case of temperature increases. The suspension at the central region may in particular be connected with one or more central metal bars 21 of a row 26 or 27 or 28 or 29 which is next to the respective heating element 11 so that the heating element 11 is held by neighboring metal bars 21. Preferably, a heating element 11 is only suspended at its upper region, for example only at the upper holding bar 15, and its lower edge hangs free in the air. In this way also a heat expansion downwards and upwards is freely possible.

Figure 10:
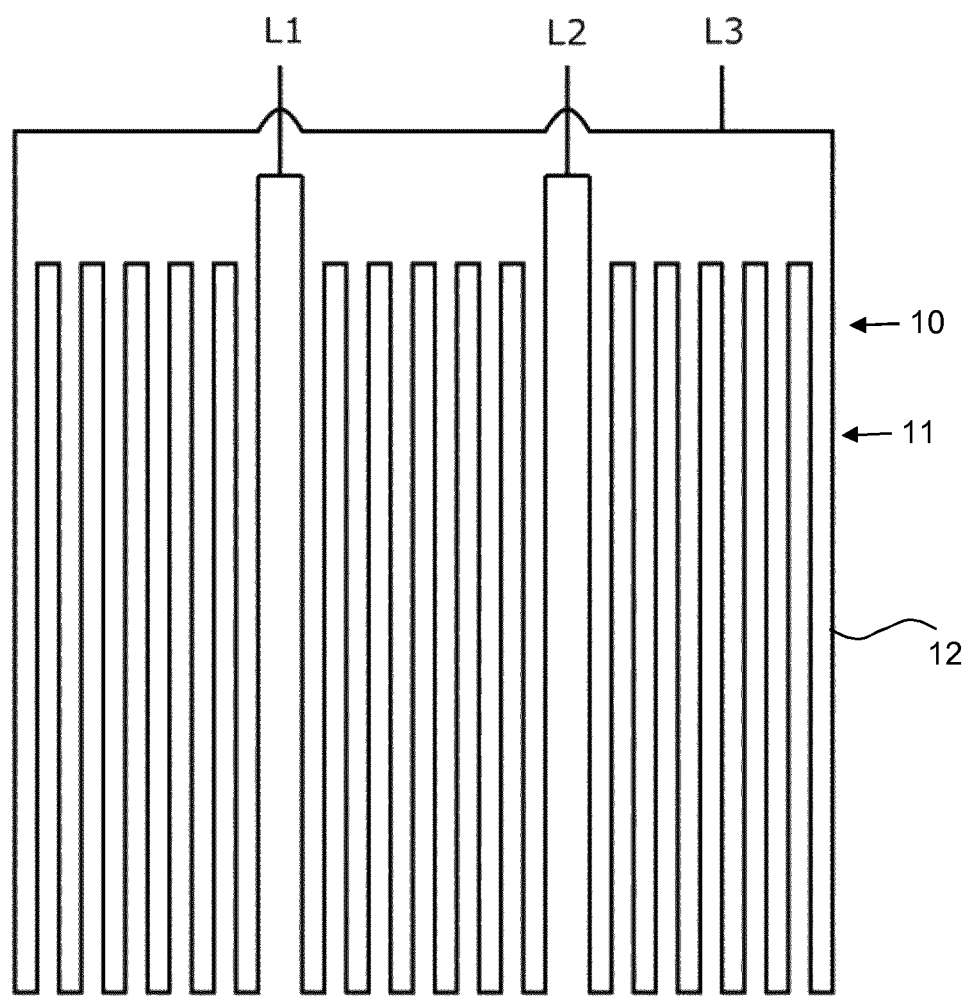
FIG. 10 an electrical contact of a heating element of an energy storage of the invention.

FIG. 10 shows schematically an electrical contact of a meandering lane 12. Three electrical contacts/terminals L1, L2 and L3 may be provided which are supplied with the three phases of the regular grid voltage. This uses the power grid uniformly.

The design of the energy storage according to the invention achieves in a cost-efficient and robust way that thermal expansions of components of the energy storage are unproblematic. Simultaneously energy can be efficiently input, stored and output from the energy storage.

The invention claimed is:

1. An energy storage device for storing electrical energy as heat energy, comprising:
   an electrical heater for converting electrical energy into heat energy;
   a heat storage device for storing heat energy of the electrical heater; and
   a heat exchanger for outputting heat energy from the heat storage device;
   wherein
   the heat storage device comprises at least:
      a plurality of metal bars arranged upright for storing heat energy of the electrical heater;
      a base;
      a plurality of supporting units, wherein each supporting unit is connected with one of the metal bars and with the base.

2. The energy storage device of claim 1,
wherein
the metal bars are spaced apart from the base, and
a heat transfer coefficient of the material of the supporting units is smaller than a heat transfer coefficient of the material of the metal bars.

3. The energy storage device of claim 1,
wherein
the base is a block of concrete which defines a ground area above which the metal bars are held by means of the supporting units.

4. The energy storage device of claim 1,
wherein
each supporting unit is or comprises a pipe;
said pipes have a smaller cross section than the supported metal bars.

5. The energy storage device of claim 4,
wherein
each metal bar has a receiving opening at its lower end, the supporting unit protrudes into the receiving opening to carry the respective metal bar, and
an outer circumference of each metal bar is free and does not contact the supporting units.

6. The energy storage device of claim 1,
wherein
the metal bars are arranged in several rows next to each other and are aligned with their longitudinal axes in parallel to each other.

7. The energy storage device of claim 6,
wherein
a distance between neighboring metal bars of one row is larger than a temperature expansion which neighboring metal bars experience in a direction of the row if heated from 20° C. to a temperature 100° C. below their melting temperature, and said distance is smaller than five times the temperature expansion.

8. The energy storage device of claim 1,
wherein
the heat exchanger comprises a ventilator to direct gas as a heat transfer medium along the metal bars,
a casing is provided which encloses the electrical heater and the heat storage device,
the heat exchanger comprises an inlet pipe in a lower region of the casing to introduce gas to be heated into the lower region of the casing, in particular in a region below the metal bars, and the heat exchanger comprises an outlet pipe at an upper region of the casing to output heated gas out of the upper region of the casing,
the heat exchanger forms a closed circuit and includes an inert gas or gas mixture as gas in the closed circuit,
a second heat exchanger is arranged at the closed circuit, wherein heat energy is output through the second heat exchanger to a second fluid circuit, and the ventilator of the heat exchanger is arranged outside of the casing, in particular between the second heat exchanger and the inlet pipe,
the closed circuit of the heat exchanger comprises an expansion volume with a size increasing with increasing pressure.

9. The energy storage device of claim 1,
wherein
the heat exchanger comprises a plurality of heat exchanger tubes extending between the metal bars and spaced apart from the metal bars to allow for variable thermal expansions there between,
or
the electrical heater comprises a plurality of heating elements arranged between the metal bars and spaced apart from the metal bars to allow for variable thermal expansions there between.

10. The energy storage device of claim 9,
wherein
a respective suspension is provided for each heating element, wherein the suspension is located at a central region of the respective heating element as seen in a horizontal direction, to allow for thermal expansion of the heating elements in the horizontal direction,
a lower side of each heating element is freely held in the air to allow for thermal expansion of the heating elements in a vertical direction.

11. The energy storage device of claim 1,
wherein
heat is transferred from the heating elements to the metal bars of the heat storage device by heat radiation and through gas located there between, wherein no connecting body is provided between the heating elements and the metal bars through which heat could be transferred.

12. The energy storage device of claim 9,
wherein
a row distance between neighboring rows of metal bars is larger than a distance of neighboring metal bars within one row,
the heat exchanger tubes are arranged between some of the neighboring rows of metal bars and the heating elements are arranged between others of the neighboring rows of metal bars,
the heat exchanger tubes extend horizontally between the rows of metal bars or with a slope smaller than 10%.

13. The energy storage device of claim 9,
wherein
several of the heat exchanger tubes are in each case stacked on top of each other and spaced apart from each other in different height layers, for receiving heat energy which is given off over the height of the metal bars,
one or more pumps for conveying fluid through the heat exchanger tubes are provided and arranged such that flow directions of fluid in neighboring stacked heat exchanger tubes are opposite to each other.

14. The energy storage device of claim 1,
wherein
each heating element comprises a metal plate in which free spaces are formed such that the metal plate forms a meandering lane over which an electrical voltage can be applied through electrical terminals,
a respective holding element is provided in an upper or lower region of different meandering lane sections, and one or more holding bars are provided which comprise holding features at positions corresponding to the holding elements, wherein the holding features engage with the holding elements and thus hold the metal plate and ensure a distance between the meandering lane sections, wherein the holding bars are electrically insulating at least at their surfaces, and
each metal plate covers a height between rows of metal bars corresponding to at least 70% of the height of the metal bars, and each metal plate covers a length extending over a whole row length of the neighboring rows of metal bars.

15. A method for operating an energy storage device in which electrical energy can be stored as heat energy and from which heat energy can be output, the method comprising:
- converting electrical energy into heat energy by means of an electrical heater;
- storing heat energy of the electrical heater with a heat storage device; and
- outputting heat energy of the heat storage device with a heat exchanger;

wherein
the heat storage device comprises at least:
- a plurality of metal bars which are arranged upright and which store heat energy from the electrical heater,
- a base,
- a plurality of supporting units wherein each supporting unit supports one of the metal bars and is connected with the base.

\* \* \* \* \*